United States Patent
Motoi

(10) Patent No.: US 9,323,454 B2
(45) Date of Patent: Apr. 26, 2016

(54) ELECTRONIC APPARATUS, HANDWRITING DISPLAY METHOD, AND STORAGE MEDIUM

(71) Applicant: KABUSHIKI KAISHA TOSHIBA, Minato-ku, Tokyo (JP)

(72) Inventor: Shigeru Motoi, Kokubunji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 255 days.

(21) Appl. No.: 13/926,414

(22) Filed: Jun. 25, 2013

(65) Prior Publication Data

US 2014/0118295 A1 May 1, 2014

(30) Foreign Application Priority Data

Nov. 1, 2012 (JP) ................... 2012-241777

(51) Int. Cl.
*G06F 3/045* (2006.01)
*G06F 3/041* (2006.01)
*G06F 3/0488* (2013.01)

(52) U.S. Cl.
CPC .................. *G06F 3/04883* (2013.01)

(58) Field of Classification Search
CPC .......... G06K 9/00852; G06K 9/00859; G06K 9/00865; G06K 9/00872; G06K 9/00879; G06K 9/00402; G06K 9/00154; G06K 9/222; G06F 3/04883

USPC .................................... 345/156–178
See application file for complete search history.

(56) References Cited

U.S. PATENT DOCUMENTS 5,748,512 A * 5/1998 Vargas .................... 708/142
2011/0310118 A1* 12/2011 Asmi et al. ................ 345/619
2013/0271487 A1* 10/2013 Lincoln ..................... 345/619

FOREIGN PATENT DOCUMENTS

JP        2011-100282 A        5/2011

* cited by examiner

*Primary Examiner* — Amit Chatly
(74) *Attorney, Agent, or Firm* — Knobbe, Martens, Olson & Bear, LLP

(57) ABSTRACT

According to one embodiment, an electronic apparatus includes a touchscreen display and a display controller. The display controller is configured to display, on the touchscreen display, a locus of first contact input detected on the touchscreen display. The display controller is configured to draw a first line corresponding to the locus of the first contact input, and to draw a second line, based on a prediction based on a first position of the first contact input. The display controller is configured to display the second line in addition to the first line on the touchscreen display for a first duration of time.

15 Claims, 8 Drawing Sheets

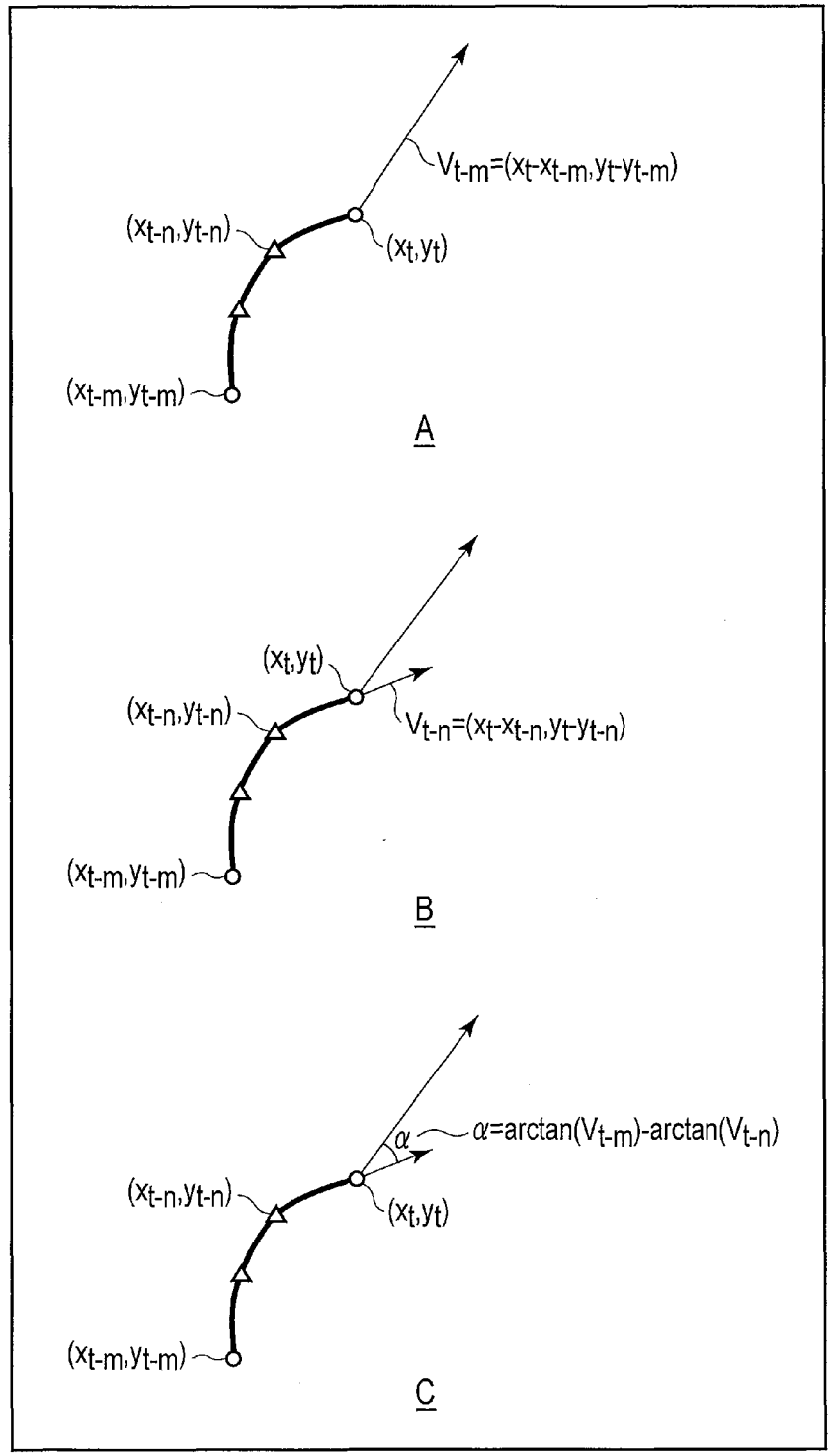
F I G. 10

ELECTRONIC APPARATUS, HANDWRITING DISPLAY METHOD, AND STORAGE MEDIUM

CROSS-REFERENCE TO RELATED APPLICATIONS

This application is based upon and claims the benefit of priority from Japanese Patent Application No. 2012-241777, filed Nov. 1, 2012, the entire contents of which are incorporated herein by reference.

FIELD

Embodiments described herein relate generally to an information processing technique of an electronic apparatus including a handwriting input function.

BACKGROUND

In recent years, various battery powered portable electronic apparatuses such as a tablet device, personal digital assistant (PDA), and smartphone have been developed. Many electronic apparatuses of this kind include touchscreen displays in order to facilitate input operations by users.

A user can instruct an electronic apparatus to execute a function associated with a menu or object displayed on a touchscreen display by touching the menu or object with a finger or the like.

This input operation using the touchscreen display is not limited to the operation of giving operation instructions to the electronic apparatus, and is also used to input documents by handwriting. Recently, users are beginning to attend meetings by carrying electronic apparatuses of this kind, and make notes by inputting handwriting on touchscreen displays. Various methods have been proposed for processing pertaining to this handwriting input.

When drawing a character or picture on a touchscreen display with a stylus or finger, the input data is processed by software including an operating system (OS), and a delay of about a few ten to 100 ms is produced until the character or picture is actually displayed on the touchscreen display. This delay spoils the writability of handwriting input on the touchscreen display.

As a measure to improve this, it is possible to predict the direction and size (length) of the extension of a line segment from a previous handwriting. It is, however, needless to say that any prediction sometimes goes wrong, so demands have arisen for a method of reducing user disconcertment if prediction goes wrong.

Also, a process of performing correction only when prediction goes wrong requires an extra calculation cost in order to detect whether prediction is right or wrong. Depending on a correction method, a drawn line segment may be different from a user's handwriting (the drawn line segment may come off the actual data input position under the influence of, for example, extra smoothing for making a wrong prediction inconspicuous). Accordingly, demands have arisen for a method of providing a user with a good feel of writing having a high response performance by using a predicted line segment, without increasing the calculation cost or causing user disconcertment.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 10 is an exemplary first view for explaining the principle (fourth pattern) of the handwriting display process executed by the digital notebook application program operating on the electronic apparatus of the embodiment.

DETAILED DESCRIPTION

Various embodiments will be described hereinafter with reference to the accompanying drawings.

In general, according to one embodiment, an electronic apparatus includes a touchscreen display and a display controller. The display controller is configured to display, on the touchscreen display, a locus of first contact input detected on the touchscreen display. The display controller is configured to draw a first line corresponding to the locus of the first contact input, and to draw a second line, based on a prediction based on a first position of the first contact input. The display controller is configured to display the second line in addition to the first line on the touchscreen display for a first duration of time.

Figure 1:
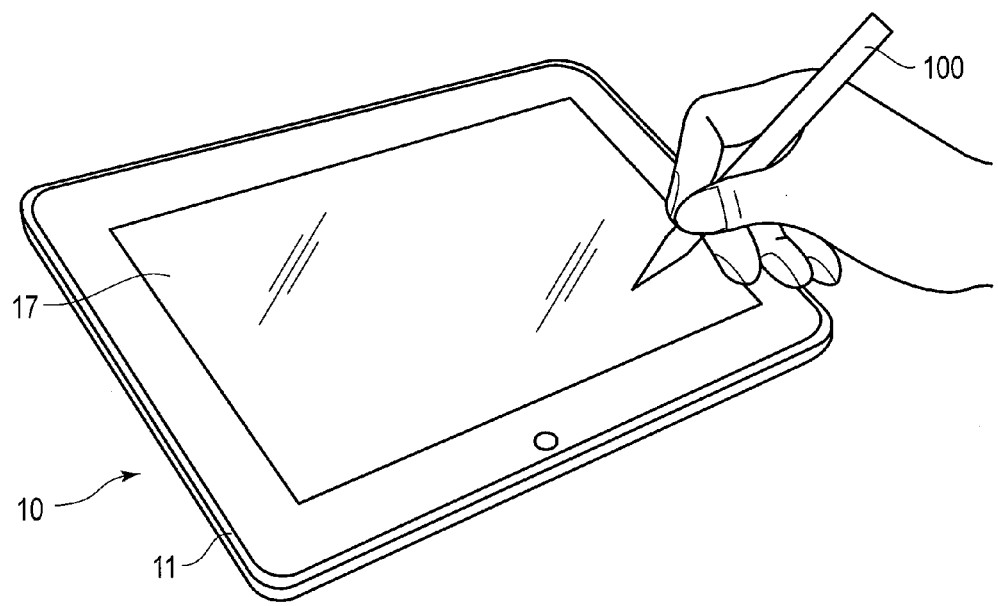
FIG. 1 is an exemplary perspective view showing the outer appearance of an electronic apparatus of an embodiment.

An electronic apparatus of this embodiment can be implemented as a stylus-based portable electronic apparatus capable of handwriting input with a stylus or finger, such as a tablet device, notebook computer, smartphone, or PDA. FIG. 1 is an exemplary perspective view showing the outer appearance of the electronic apparatus according to this embodiment. As shown in FIG. 1, it is assumed that the electronic apparatus is implemented as a tablet device 10. The tablet device 10 includes a main body 11 and touchscreen display 17. The touchscreen display 17 is attached to be overlaid on the upper surface of the main body 11.

The main body 11 has a thin boxy housing. The touchscreen display 17 includes a flat panel display, and a sensor configured to detect a position touched by a stylus or finger on the screen of the flat panel display. The flat panel display can also be, for example, a liquid crystal display (LCD). As the sensor, it is possible to use, for example, a capacitance type touchpanel or electromagnetic induction type digitizer. In the following description, it is assumed that both of the two types of sensors, i.e., the digitizer and touchpanel are incorporated into the touchscreen display 17.

Each of the digitizer and touchpanel is formed to cover the screen of the flat panel display. The touchscreen display 17 can detect not only touch input (contact input) performed on the screen by using a finger, but also touch input (contact input) performed on the screen by using a stylus 100. The stylus 100 can also be, for example, an electromagnetic induction type stylus. The user can perform handwriting input on the touchscreen display 17 by using the stylus 100 or a finger. The locus (handwriting) of handwriting input using the stylus 100 or a finger is displayed on the screen.

Figure 2:
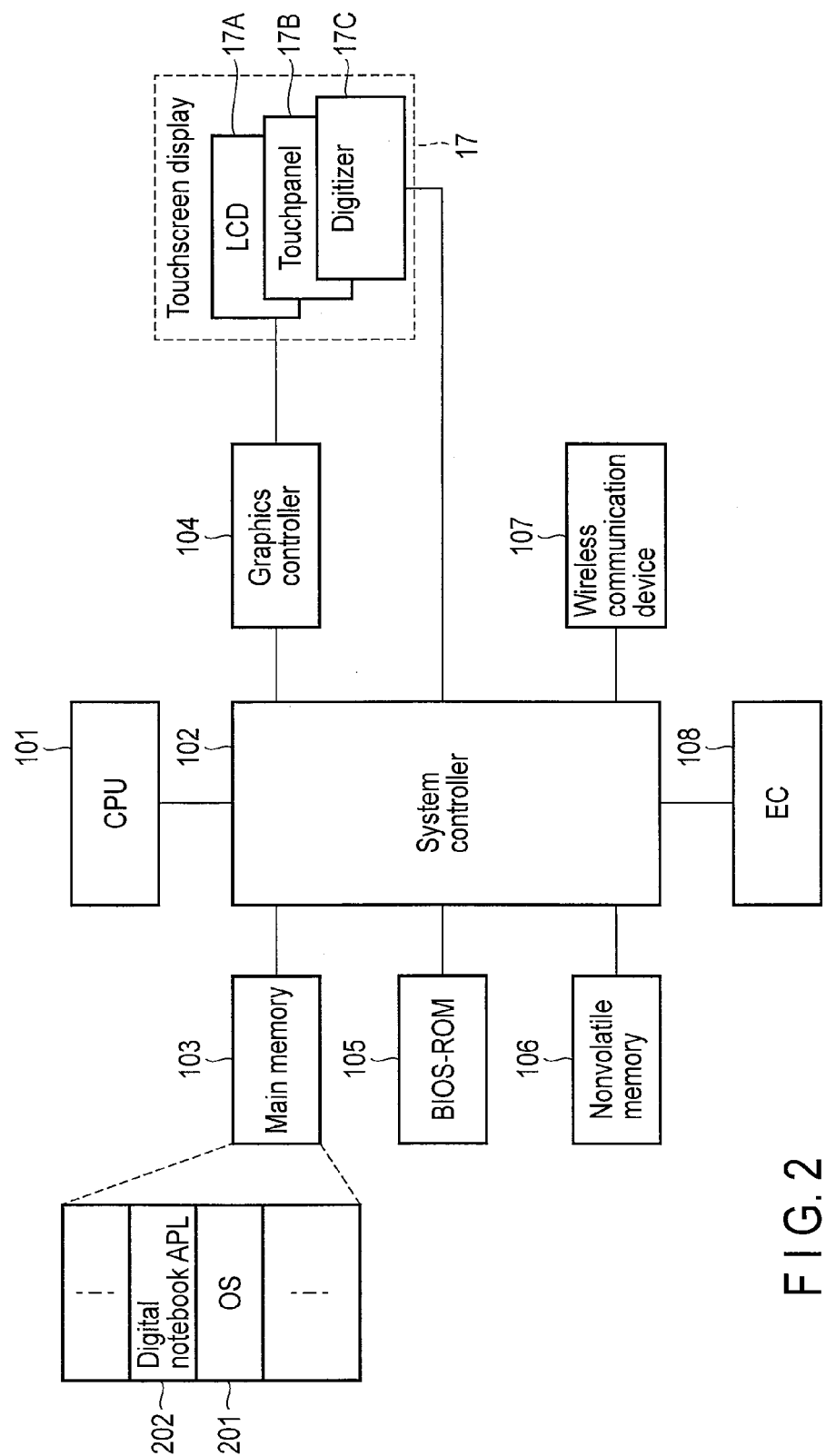
FIG. 2 is an exemplary view showing the system configuration of the electronic apparatus of the embodiment.

FIG. 2 is an exemplary view showing the system configuration of the tablet device 10.

As shown in FIG. 2, the tablet device 10 includes a CPU 101, system controller 102, main memory 103, graphics controller 104, BIOS ROM 105, nonvolatile memory 106, wireless communication device 107, and embedded controller (EC) 108.

The CPU 101 is a processor for controlling the operations of various modules in the tablet device 10. The CPU 101 executes various kinds of software loaded into the main memory 103 from the nonvolatile memory 106. These pieces of software include an operating system (OS) 201 and various application programs. The various application programs include a digital notebook application program 202. The digital notebook application program 202 provides the above described function of displaying the locus (handwriting) of handwriting input on the screen.

The CPU 101 also executes a basic input/output system (BIOS) stored in the BIOS ROM 105. The BIOS is a program for hardware control.

The system controller 102 is a device that connects the local bus of the CPU 101 and various components. The system controller 102 incorporates a memory controller for controlling access to the main memory 103. Also, the system controller 102 includes a function of communicating with the graphics controller 104 via a serial bus complying with the PCI EXPRESS standards.

The graphics controller 104 is a display controller for controlling an LCD 17A used as a monitor display of the tablet device 10. A display signal generated by the graphics controller 104 is supplied to the LCD 17A. The LCD 17A displays a screen image based on the display signal. A touchpanel 17B and digitizer 17C are arranged on the LCD 17A. The touchpanel 17B is a capacitance type pointing device for performing an input operation on the screen of the LCD 17A. The touchpanel 17B detects a position touched on the screen by a finger. The digitizer 17C is an electromagnetic induction type pointing device for performing an input operation on the screen of the LCD 17A. The digitizer 17C detects a position touched on the screen by the stylus 100.

The wireless communication device 107 is a device configured to execute wireless communication such as a wireless LAN or 3G mobile communication. The EC 108 is a single-chip microcomputer including an embedded controller for power management. The EC 108 includes a function of turning on/off the power supply of the tablet device 10 in accordance with a power button operation by the user.

Figure 3:
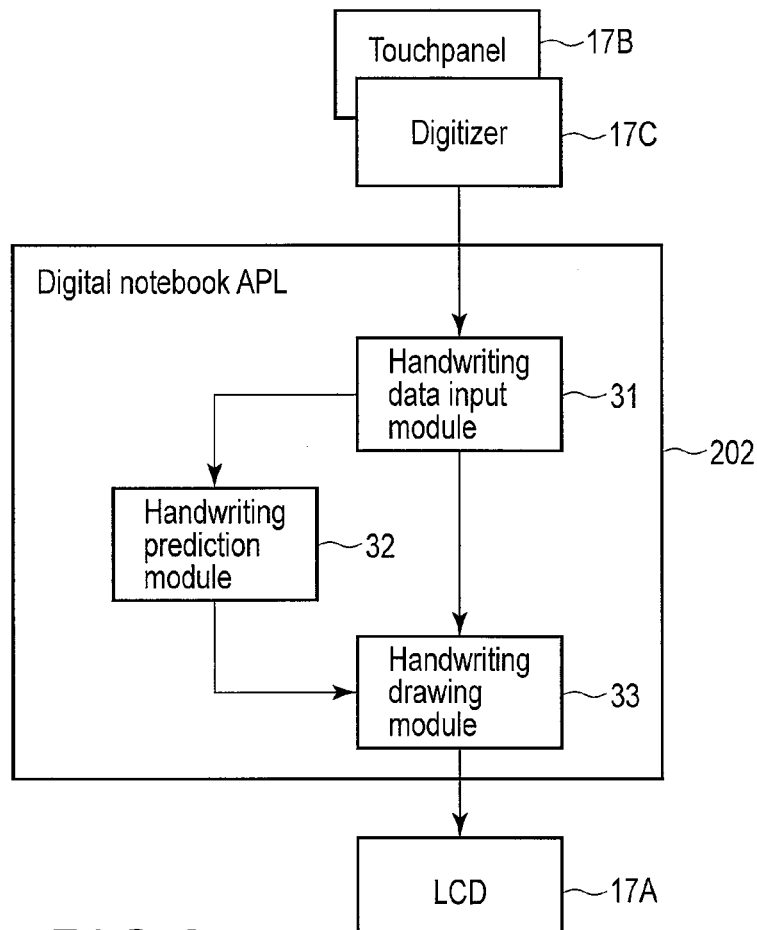
FIG. 3 is an exemplary functional block diagram of a digital notebook application program operating on the electronic apparatus of the embodiment.

FIG. 3 is an exemplary function block diagram of the digital notebook application program 202 operating on the tablet device 10.

As shown in FIG. 3, the digital notebook application program 202 includes a handwriting data input module 31, handwriting prediction module 32, and handwriting drawing module 33.

As described above, the touchscreen display 17 detects a touch operation on the screen by the touchpanel 17B or digitizer 17C. The handwriting data input module 31 is a module that receives a detection signal output from the touchpanel 17B or digitizer 17C. The detection signal contains coordinate information (X, Y). The detection signal received by the handwriting data input module 31 is supplied to the handwriting prediction module 32 and handwriting drawing module 33.

The handwriting drawing module 33 is a module that draws the locus (handwriting) of handwriting input and displays the locus on the LCD 17A of the touchscreen display 17. First, the handwriting drawing module 33 includes a first drawing function of drawing a line segment corresponding to the locus (handwriting) of handwriting input based on the detection signal from the handwriting data input module 31.

Based on the detection signal from the handwriting data input module 31, the handwriting prediction module 32 subsequently predicts the position of a touch operation to be detected by the touchpanel 17B or digitizer 17C, and supplies the prediction result to the handwriting drawing module 33 as a prediction signal having, for example, the same format as that of the detection signal from the handwriting data input module 31.

Second, the handwriting drawing module 33 includes a second drawing function of drawing a line segment (predicted line segment) predictively following the line segment corresponding to the locus (handwriting) of handwriting input, based on the prediction signal from the handwriting prediction module 32. That is, the handwriting drawing module 33 displays, on the LCD 17A of the touchscreen display 17, the line segment corresponding to the locus (handwriting) of handwriting input, and the line segment (predicted line segment) predictively following the line segment corresponding to the locus (handwriting) of handwriting input. The tablet device 10 includes a mechanism that, for example, reduces user disconcertment if prediction goes wrong. This feature will be described in detail below.

To help understand the principle of the handwriting display process executed by the tablet device 10, the delay of drawing will be explained first with reference to FIG. 4.

When a character or picture is drawn on the touchscreen display 17 by using, for example, the stylus 100, the digitizer 17C detects the position touched on the screen by the stylus 100 as described previously. The digitizer 17C outputs, to the system controller 102, a detection signal containing coordinate information indicating the touched position. The system controller 102 stores the detection signal received from the digitizer 17C in a register of the system controller 102, and generates an interrupt signal to the CPU 101.

When this interrupt signal is generated, the BIOS executed by the CPU 101 reads the detection signal from the register of the system controller 102, and inputs the read signal to the digital notebook application program 202 operating under the control of the OS 201. Based on this detection signal, the digital notebook application program 202 draws a line segment corresponding to the locus (handwriting) of handwriting input, and displays the line segment on the LCD 17A of the touchscreen display 17.

Figure 4:
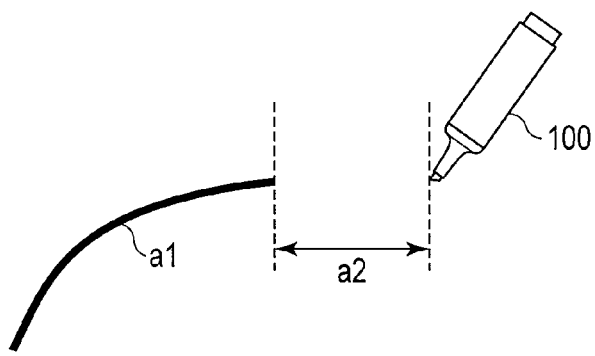
FIG. 4 is an exemplary view for explaining a handwriting display delay.

Reference symbol a1 in FIG. 4 denotes the line segment corresponding to the locus (handwriting) of handwriting input and displayed on the LCD 17A of the touchscreen display 17. However, the stylus 100 keeps moving on the touchscreen display 17 from the timing at which the digitizer 17C detects the position touched on the screen by the stylus 100 to the timing at which the digital notebook application program 202 displays, through the above described process, the line segment corresponding to the locus (handwriting) of handwriting input on the LCD 17A of the touchscreen display 17. Accordingly, the line is drawn (displayed) with a delay from the position of the stylus 100. Reference symbol a2 in FIG. 4 denotes a drawing delay zone thus produced.

(First Pattern)

Next, the principle (first pattern) of the handwriting display process executed by the tablet device 10 will be explained with reference to FIG. 5.

The handwriting drawing module 33 of the digital notebook application program 202 displays a line segment (b1) based on the prediction signal from the handwriting prediction module 32 by adding the line segment (b1) to the line segment (a1) based on the detection signal from the handwriting data input module 31. The prediction by the handwriting prediction module 32 can reduce the drawing delay zone (a2) to b2 shown in FIG. 5.

Figure 5:
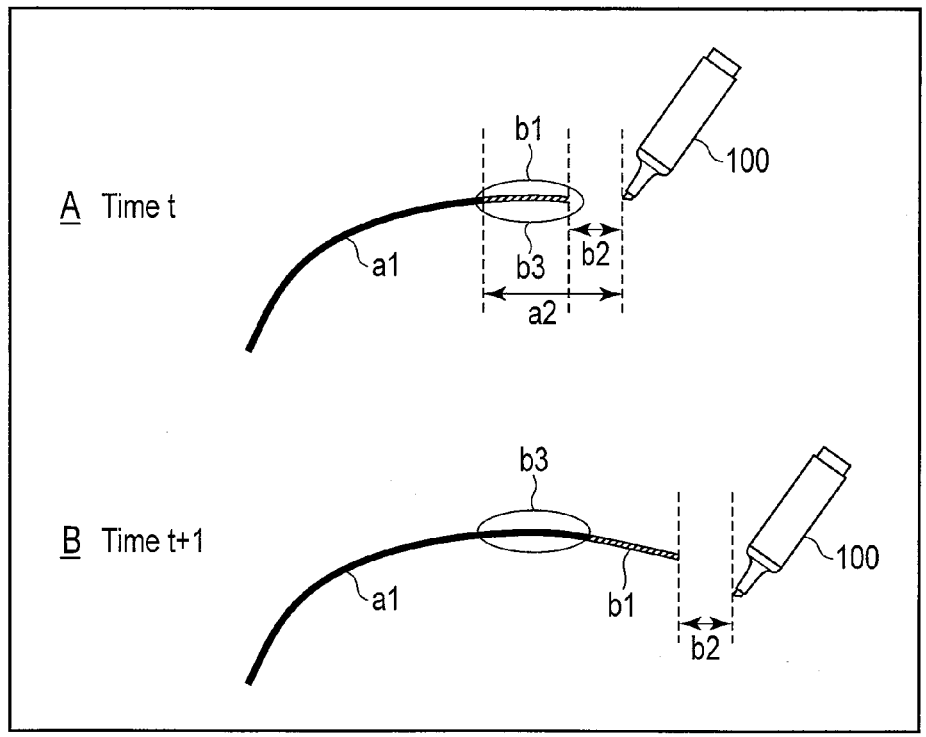
FIG. 5 is an exemplary view for explaining the principle (first pattern) of a handwriting display process executed by the digital notebook application program operating on the electronic apparatus of the embodiment.

As shown in FIG. 5, the tablet device 10 controls the predicted line segment (b1) at each time (t, t+1). That is, the tablet device 10 performs control such that a line segment seen to the user at given time is always the line segment (a1) based on the detection signal+the predicted line segment (b1). In other words, the predicted line segment (b1) is displayed during only a predetermined period.

More specifically, the line segment (a1) based on the detection signal is carried over to the next time and grows by reflecting the detection signal at the next time, but the predicted line segment (b1) written at time t is not carried over to time t+1. As indicated by reference symbol b3, the predicted line segment (b1) is not drawn at the next time, and the line segment (a1) based on the detection signal is drawn instead. The predicted line segment (b1) is drawn as it is newly added to the line segment (a1) based on the detection signal. When handwriting is thus drawn, the user perceives that the line continuously extends if the prediction is right (if the predicted line segment (b1) at time t almost matches the line segment (a1) extended at time t+1). On the other hand, even if the prediction goes wrong, the predicted line segment (b1) at time t at which prediction goes very wrong disappears, and the line segment (a1) based on the detection signal is displayed instead. Therefore, the user feels only a momentary flickering, i.e., the wrong prediction is almost inconspicuous.

As described above, the tablet device 10 that displays the predicted line segment (b1) during only a predetermined period can reduce user disconcertment if prediction goes wrong.

(Second Pattern)

The principle (second pattern) of the handwriting display process executed by the tablet device 10 will be explained below with reference to FIG. 6.

Figure 6:
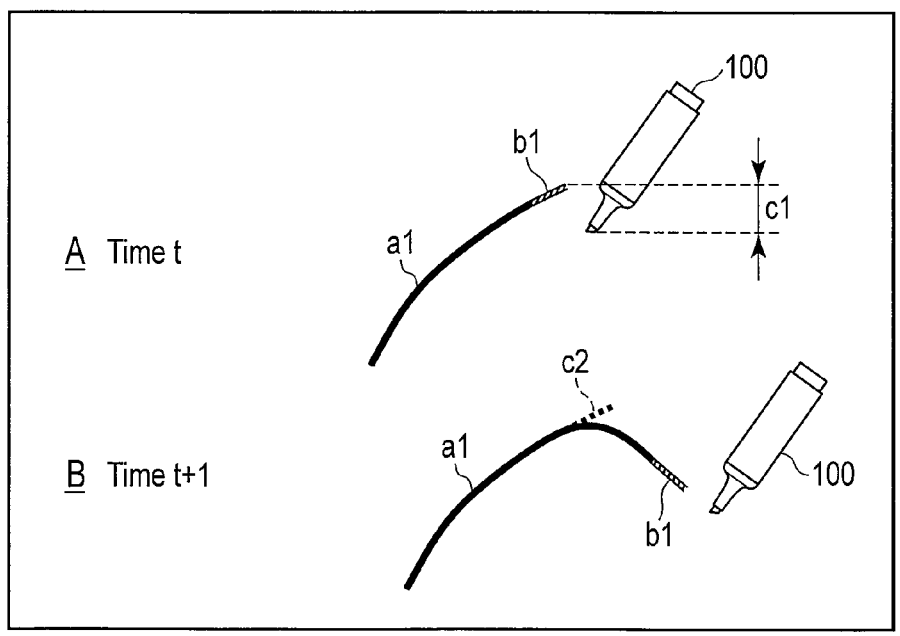
FIG. 6 is an exemplary view for explaining the principle (second pattern) of the handwriting display process executed by the digital notebook application program operating on the electronic apparatus of the embodiment.

In FIG. 6, reference symbol c1 denotes a prediction error amount. The tablet device 10 lightens the color of the predicted line segment (b1) displayed during only a predetermined period, when compared to the color of the line segment (a1) based on the detection signal. For example, when color data is formed by a set of red (R), green (G), and blue (B), black can be expressed by setting R, G, and B at the same value. Also, black is expressed when this color data is set at, for example, either (0, 0, 0) or (50, 50, 50), but the latter black is lighter than the former. The color of the predicted light segment (b1) is lightened by setting this color data. The color data is set when the handwriting drawing module 33 draws the predicted line segment (b1).

By lightening the color of the predicted line segment (b1) displayed during only a predetermined period compared to the color of the line segment (a1) based on the detection signal, even if a wrong prediction having an error amount as indicated by reference symbol c1 occurs, the tablet device 10 can make this wrong prediction more inconspicuous. Note that a broken line denoted by reference symbol c2 indicates a position where the predicted line segment (b1) is displayed at one time earlier (i.e., a position where the predicted line segment (b1) is not displayed at that point of time).

(Third Pattern)

The principle (third pattern) of the handwriting display process executed by the tablet device 10 will be explained below with reference to FIG. 7 and FIG. 8. The above-mentioned explanation is based on the premise that the predicted line segment (b1) written at time t is not carried over to time t+1. That is, the display period of the predicted line segment (b1) is the period of one time. By contrast, in the third pattern, the display period of the predicted line segment (b1) is, for example, the period of two or three times, and the color of the predicted line segment (b1) is lightened as the time elapses.

Figure 7:
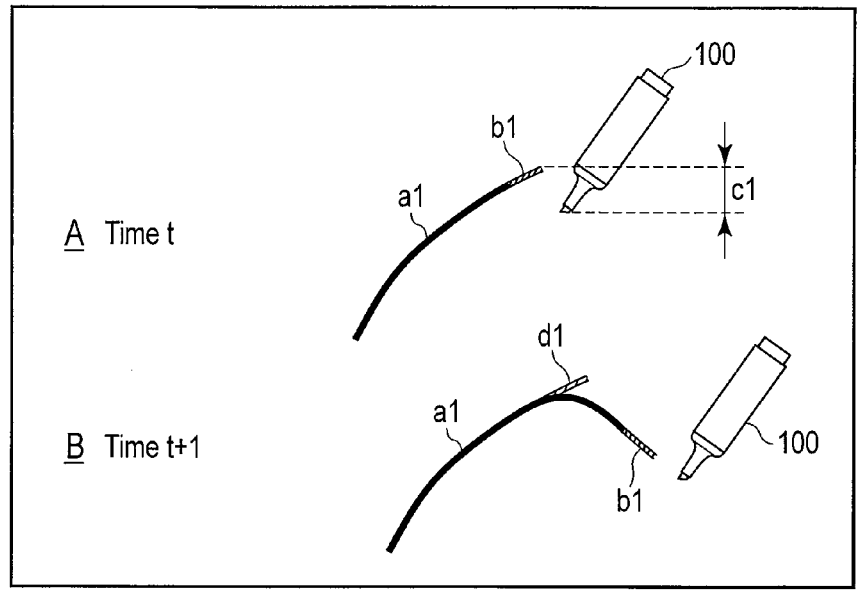
FIG. 7 is an exemplary first view for explaining the principle (third pattern) of the handwriting display process executed by the digital notebook application program operating on the electronic apparatus of the embodiment.

FIG. 7 shows a display example of the handwriting by the table terminal 10 when the display period of the predicted line segment (b1) is the period of two times.

Referring to FIG. 7, a line segment denoted by reference symbol d1 is a predicted line segment that has begun to be displayed at time t and is continuously displayed at time t+1. At time t+1, a new predicted line segment (b1) begins to be displayed. At time t+1, the tablet device 10 lightens the color of the predicted line segment (d1) having begun to be displayed at time t, when compared to the color of the predicted line segment (b1) that begins to be displayed at time t+1.

Figure 8:
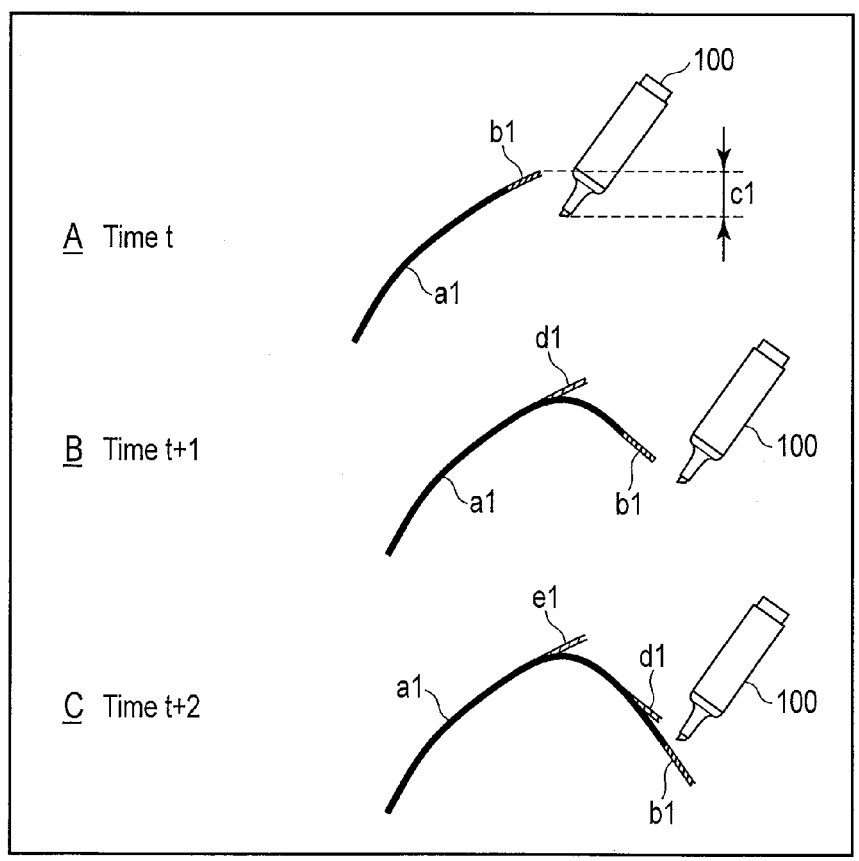
FIG. 8 is an exemplary second view for explaining the principle (third pattern) of the handwriting display process executed by the digital notebook application program operating on the electronic apparatus of the embodiment.

FIG. 8 shows a display example of the handwriting by the tablet device 10 when the display period of the predicted line segment (b1) is the period of three times.

Referring to FIG. 8, a line segment denoted by reference symbol e1 is a predicted line segment that has begun to be displayed at time t and is continuously displayed at time t+2. At time t+2, the tablet device 10 lightens the color of the predicted line segment (d1) having begun to be displayed at time t+1 compared to the color of the predicted line segment (b1) that begins to be displayed at time t+2, and further lightens the color of the predicted line segment (e1) having begun to be displayed at time t compared to the color of the predicted line segment (d1).

The handwriting drawing module 33 adjusts the color density of each predicted line segment by setting the color data of the predicted line segment at each time.

By thus lightening, as the time elapses, the color of a predicted line segment having begun to be displayed at one or more times earlier, the tablet device 10 can show a natural display by suppressing flickering.

(Fourth Pattern)

Next, a method of making a wrong prediction inconspicuous by adjusting the length of a predicted line segment will be explained.

Figure 9:
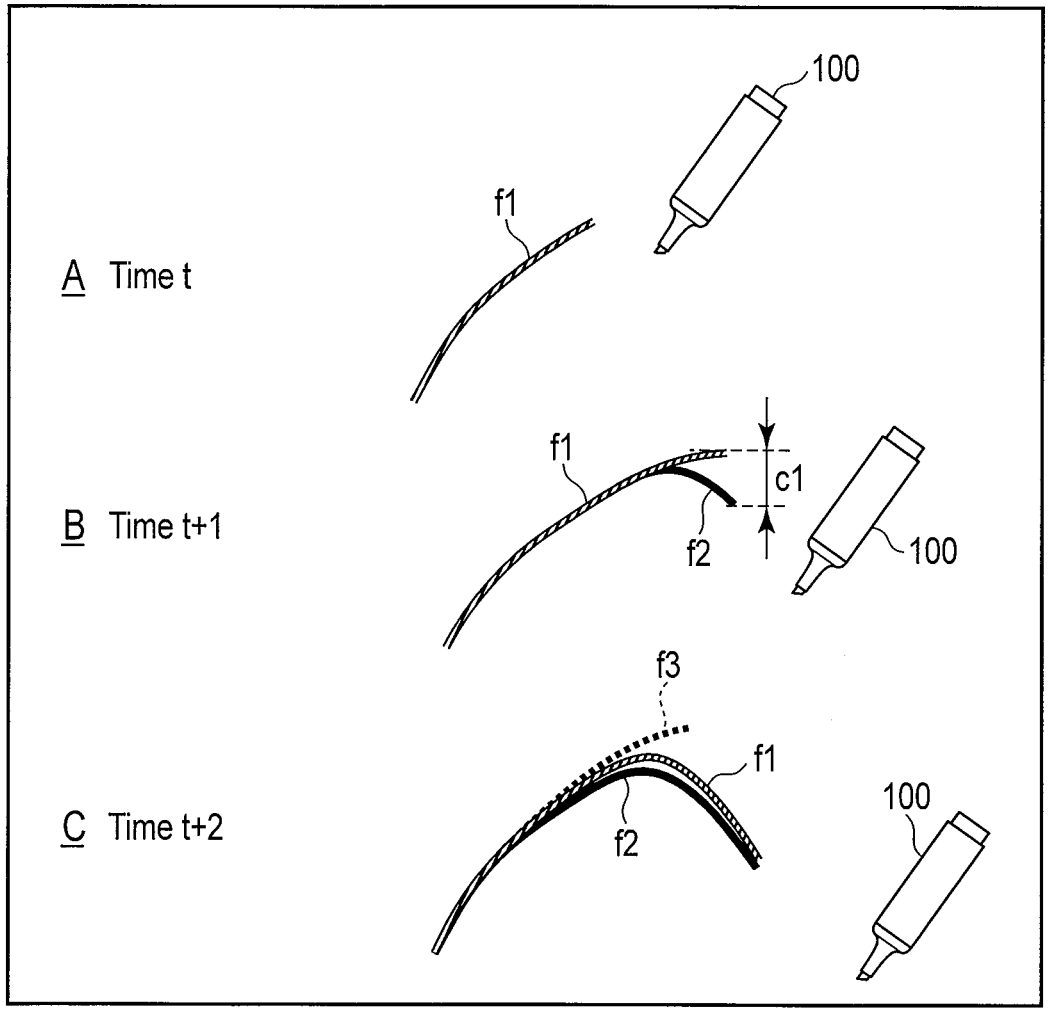
FIG. 9 is an exemplary view showing an example of smoothing of a handwriting (predicted line segment).

First, FIG. 9 shows an example of general smoothing of handwriting (predicted line segment).

The tablet device 10 displays a predicted line segment for reducing a drawing delay during only a predetermined period.

As shown in FIG. 9, however, when displaying a predicted line segment directly as a handwriting, the calculation of an error amount (c1) and smoothing based on the calculated error amount (c1) are performed in many cases in order to make a wrong prediction inconspicuous. A line segment denoted by reference symbol f1 in FIG. 9 is a line segment actually displayed at each time. A line segment denoted by reference symbol f2 indicates a position where handwriting is actually performed. A line segment denoted by reference symbol f3 indicates a position where a line segment is displayed at one time earlier (i.e., a position where the line segment is not displayed at that point of time). When the time changes from time t+1 to time t+2, the handwriting (predicted line segment) is smoothed so as to make a wrong prediction inconspicuous.

When the error amount (c1) is calculated and smoothing is performed as described above, the calculation cost increases. In addition, as indicated by C in FIG. 9, the handwriting display position (f1) deviates from the handwriting position (f2).

To make a wrong prediction inconspicuous with a low calculation cost, therefore, the tablet device 10 weights handwriting prediction and adjusts the length of a predicted line segment. This feature will be described in detail below with reference to FIG. 10 and FIG. 11. Note that the handwriting prediction module 32 executes this handwriting prediction weighting.

Referring to FIG. 10, m and n are integers, and m>n>0.

In the first step, a difference vector between coordinates $(X_t, Y_t)$ and coordinates $(X_{t-m}, Y_{t-m})$ is calculated (A in FIG. 10). That is, the calculation of equation (1) below is performed.

$$V_{t-m} = (X_t - X_{t-m}, Y_t - Y_{t-m}) \qquad \text{equation (1)}$$

In the second step, a difference vector between the coordinates $(X_t, Y_t)$ and coordinates $(X_{t-n}, Y_{t-n})$ closest to the coordinates $(X_t, Y_t)$ is calculated (B in FIG. 10). That is, the calculation of equation (2) below is performed.

$$V_{t-n} = (X_t - X_{t-n}, Y_t - Y_{t-n}) \qquad \text{equation (2)}$$

After the two vectors are calculated, an angle made by these two vectors is calculated in the third step (C in FIG. 10). That is, the calculation of equation (3) below is performed.

$$\alpha = \arctan(V_{t-m}) - \arctan(V_{t-n}) \qquad \text{equation (3)}$$

In equation (3), arctan (V) returns the gradient from the origin by a radian angle $(-\pi \sim \pi)$.

Figure 11:
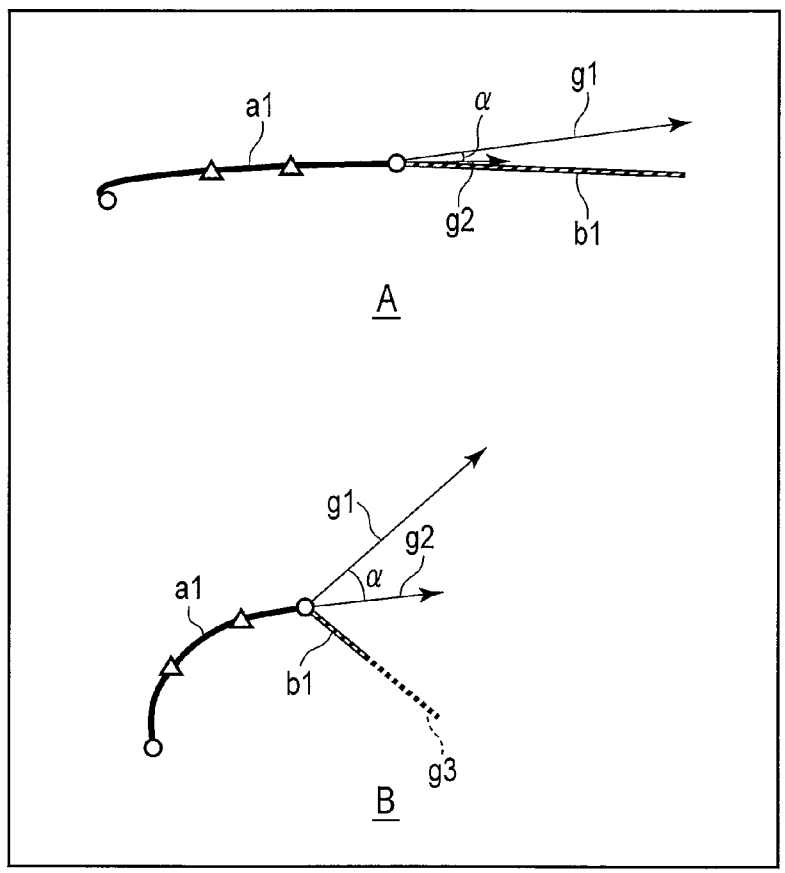
FIG. 11 is an exemplary second view for explaining the principle (fourth pattern) of the handwriting display process executed by the digital notebook application program operating on the electronic apparatus of the embodiment.

Then, as shown in FIG. 11, weight$_\alpha$ by which the predicted line segment (b1) shortens as a change amount $\alpha$ increases is set, and $V_{output}$ predicted by a given prediction algorithm is multiplied by weight$_\alpha$. In FIG. 11, a vector denoted by reference symbol g1 is calculated by equation (1), and a vector denoted by reference symbol g2 is calculated by equation (2). Also, a broken line denoted by reference symbol g3 indicates a portion of a predicted line segment displayed when no weighting is performed (i.e., a portion that is not actually displayed).

As shown in FIG. 11, the predicted vector is directly used when $\alpha$ is small (A in FIG. 11), and the predicted vector is shortened as $\alpha$ increases (B in FIG. 11).

As described above, the tablet device 10 can display a predicted line segment while reducing user disconcertment by using the method that extremely reduces the calculation cost by decreasing the predicted value when the change amount ($\alpha$) is large and prediction readily goes wrong.

(Fifth Pattern)

The first method of correcting the direction of a predicted vector from the change amount ($\alpha$) calculated by the above-mentioned (fourth pattern) will be explained below. Note that the handwriting prediction module 32 executes this correction.

After calculating $\alpha$ by equation (3) above, the tablet device 10 inclines the predicted vector by equation (4) below using a (by using an immediately preceding gradient).

$$V_{output} = ((X_t - X_{t-m}) \times \cos(\alpha) - (y_t - y_{t-m}) \times \sin(\alpha),$$
$$(X_t - X_{t-m}) \times \sin(\alpha) + (Y_t - Y_{t-m}) \times \cos(\alpha)) \qquad \text{equation (4)}$$

Consequently, the tablet device 10 can easily correct the direction of the predicted vector from only two vectors.

(Sixth Pattern)

The sixth method of correcting the direction of a predicted vector from the change amount ($\alpha$) calculated by the above-mentioned (fourth pattern) will be explained below with reference to FIG. 12. The handwriting prediction module 32 executes this correction as well.

Figure 12:
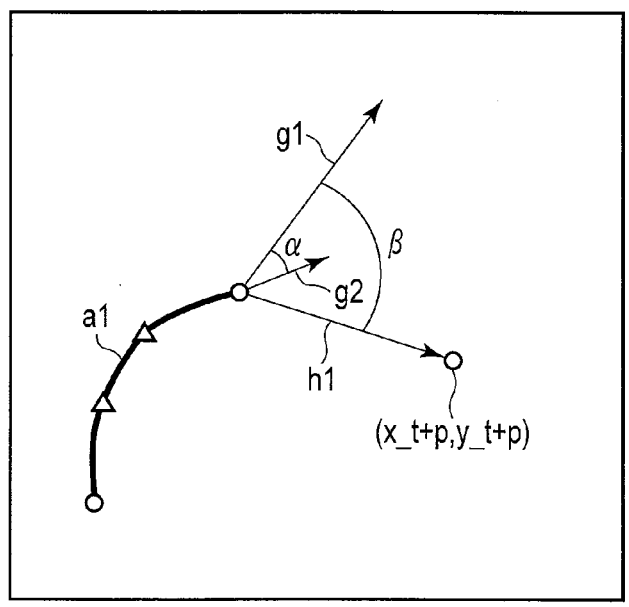
FIG. 12 is an exemplary view for explaining the principle (sixth pattern) of the handwriting display process executed by the digital notebook application program operating on the electronic apparatus of the embodiment.

Referring to FIG. 12, p is an integer, and m is a positive integer greater than n. That is, m>n>0 and p>0.

The tablet device 10 assumes that the stylus 100 or a finger is performing a uniform circular motion at a given speed in each (local) time zone for use in prediction. Based on this assumption, the tablet device 10 calculates $\alpha$ by equation (3) above, and calculates the momentum per unit time until $\alpha$ by equations (5) and (6), below.

$$\hat{\alpha} = \alpha \div (m - n) \qquad \text{equation (5)}$$

$$\beta = \alpha + p \times \hat{\alpha} \qquad \text{equation (6)}$$

Then, the tablet device 10 performs rotational correction (affine transform) on the predicted vector by using equation (7) below.

$$V_{output} = ((X_{t-m} - X_{t-n}) \times \cos(\beta) - (Y_{t-m} - Y_{t-n}) \times \sin(\beta),$$
$$(X_{t-m} - X_{t-n}) \times \sin(\beta) + (Y_{t-m} - Y_{t-n}) \times \cos(\beta)) \qquad \text{equation (7)}$$

That is, the tablet device 10 calculates a predicted angle $\beta$ at which the line shifts at the next time from $\alpha$ and the time required for a shift of $\alpha$, and rotates the predicted vector by $\beta$. A vector denoted by reference symbol h1 is the vector having undergone the rotational correction. Note that if the value of $\alpha$ is sufficiently small, it is possible to perform rotational correction by $\alpha$ or perform no rotational correction.

Thus, the tablet device 10 can easily correct the direction of a predicted vector from only two vectors.

As described above, the tablet device 10 can, for example, reduce user disconcertment if prediction goes wrong.

Note that all the operation procedures of this embodiment can be implemented by software, so the same effects as those of this embodiment can easily be implemented by installing the software in an ordinary computer by using a computer readable, non transitory storage medium.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a touchscreen display; and
a display controller configured to display, on the touchscreen display, a locus of first contact input detected on the touchscreen display, wherein:
the display controller is configured to draw a first line corresponding to the locus of the first contact input, and to draw a second line, based on a prediction based on a first position of the first contact input, and
the display controller is configured to display the second line in addition to the first line on the touchscreen display for a first duration of time,
wherein the display controller is configured to adjust a length of the second line in accordance with a difference between an angle of a first vector and an angle of a second vector, the first vector obtained from the first position and a second position where second contact input is detected before the first position, the second vector obtained from the first position and a third position where third contact input is detected before the first position and after the second position.

2. The apparatus of claim 1, wherein the display controller is configured to set color data of the second line such that the second line is configured to be displayed more lightly than the first line.

3. The apparatus of claim 2, wherein the display controller is configured to set the color data of the second line such that the second line to be displayed at a first timing is displayed more lightly than the second line to be displayed at a second timing later than the first timing.

4. The apparatus of claim 1, wherein the display controller comprises means for adjusting the length of the second line in accordance with the difference between the angle of the first vector and the angle of the second vector.

5. The apparatus of claim 1, wherein the display controller is configured to decrease the length of the second line as the difference between the angle of the first vector and the angle of the second vector increases.

6. The apparatus of claim 1, wherein the display controller is configured to perform rotational correction on the second line in accordance with the difference between the angle of the first vector and the angle of the second vector.

7. The apparatus of claim 6, wherein the display controller comprises means for performing rotational correction on the second line in accordance with the difference between the angle of the first vector and the angle of the second vector.

8. An electronic apparatus comprising:
a touchscreen display; and
a display controller configured to display, on the touchscreen display, a locus of first contact input detected on the touchscreen display, wherein:
the display controller is configured to draw a first line corresponding to the locus of the first contact input, and to draw a second line, based on a prediction based on a first position of the first contact input, and
the display controller is configured to display the second line in addition to the first line on the touchscreen display for a first duration of time,
wherein the display controller is configured to perform rotational correction on the second line in accordance with a difference between an angle of a first vector and an angle of a second vector, the first vector obtained from the first position and a second position where second contact input is detected before the first position, the second vector obtained from the first position and a third position where third contact input is detected before the first position and after the second position.

9. The apparatus of claim 8, wherein the display controller is configured to adjust the length of the second line in accordance with the difference between the angle of the first vector and the angle of the second vector.

10. The apparatus of claim 9, wherein the display controller is configured to decrease the length of the second line as the difference between the angle of the first vector and the angle of the second vector increases.

11. The apparatus of claim 8, wherein the display controller comprises means for performing rotational correction on the second line in accordance with the difference between the angle of the first vector and the angle of the second vector.

12. A handwriting display method of an electronic apparatus comprising a touchscreen display, the method comprising:
drawing a first line corresponding to a locus of first contact input detected on the touchscreen display;
drawing a second line based on a prediction based on a first position of the first contact input; and
displaying the second line in addition to the first line on the touchscreen display for a first duration of time,
wherein a length of the second line is adjusted in accordance with a difference between an angle of a first vector and an angle of a second vector the first vector obtained from the first position and a second position where second contact input is detected before the first position, the second vector obtained from the first position and a third position where third contact input is detected before the first position and after the second position.

13. A computer-readable, non-transitory storage medium comprising a computer program configured to be executed by a computer, the computer program controlling the computer to function as:
a display controller configured to display, on the touchscreen display, a locus of first contact input detected on the touchscreen display, wherein:
the display controller is configured to draw a first line corresponding to the locus of the first contact input, and to draw a second line based on a prediction based on a first position of the first contact input, and
the display controller is configured to display the second line in addition to the first line on the touchscreen display for a first duration of time,
wherein a length of the second line is adjusted in accordance with a difference between an angle of a first vector and an angle of a second vector the first vector obtained from the first position and a second position where second contact input is detected before the first position, the second vector obtained from the first position and a third position where third contact input is detected before the first position and after the second position.

14. A handwriting display method of an electronic apparatus comprising a touchscreen display, the method comprising:
drawing a first line corresponding to a locus of first contact input detected on the touchscreen display;
drawing a second line based on a prediction based on a first position of the first contact input; and
displaying the second line in addition to the first line on the touchscreen display for a first duration of time,
wherein rotational correction on the second line is performed in accordance with a difference between an angle of a first vector and an angle of a second vector, the first vector obtained from the first position and a second position where second contact input is detected before the first position, the second vector obtained from the first position and a third position where third contact input is detected before the first position and after the second position.

15. A computer-readable, non-transitory storage medium comprising a computer program configured to be executed by a computer, the computer program controlling the computer to function as:
- a display controller configured to display, on the touchscreen display, a locus of first contact input detected on the touchscreen display, wherein:
- the display controller is configured to draw a first line corresponding to the locus of the first contact input, and to draw a second line based on a prediction based on a first position of the first contact input, and
- the display controller is configured to display the second line in addition to the first line on the touchscreen display for a first duration of time,
- wherein rotational correction on the second line is performed in accordance with a difference between an angle of a first vector and an angle of a second vector, the first vector obtained from the first position and a second position where second contact input is detected before the first position, the second vector obtained from the first position and a third position where third contact input is detected before the first position and after the second position.

* * * * *